Figure 1:
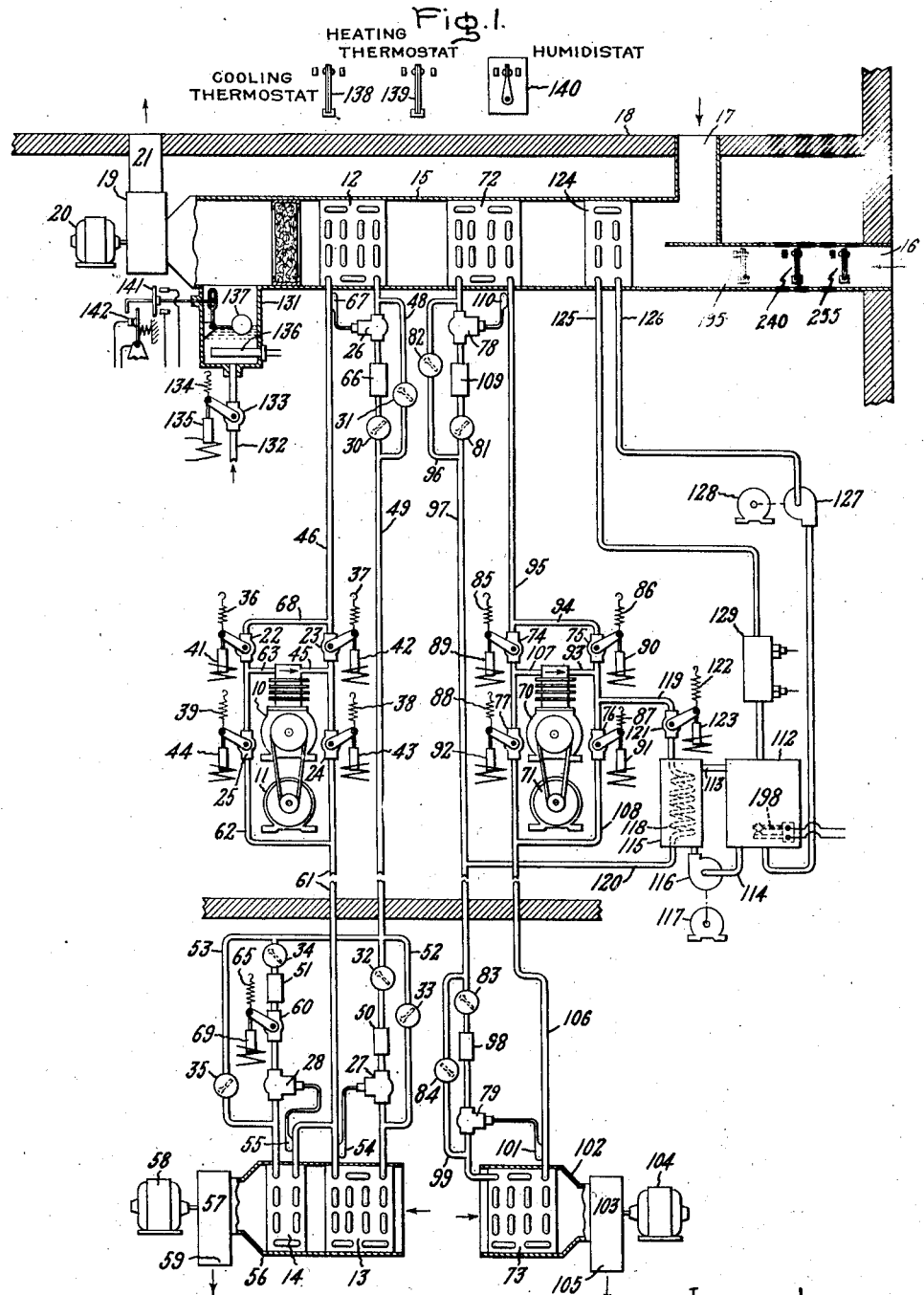

Inventor:
Hal Gibson,
by Harry E. Dunham
His Attorney.

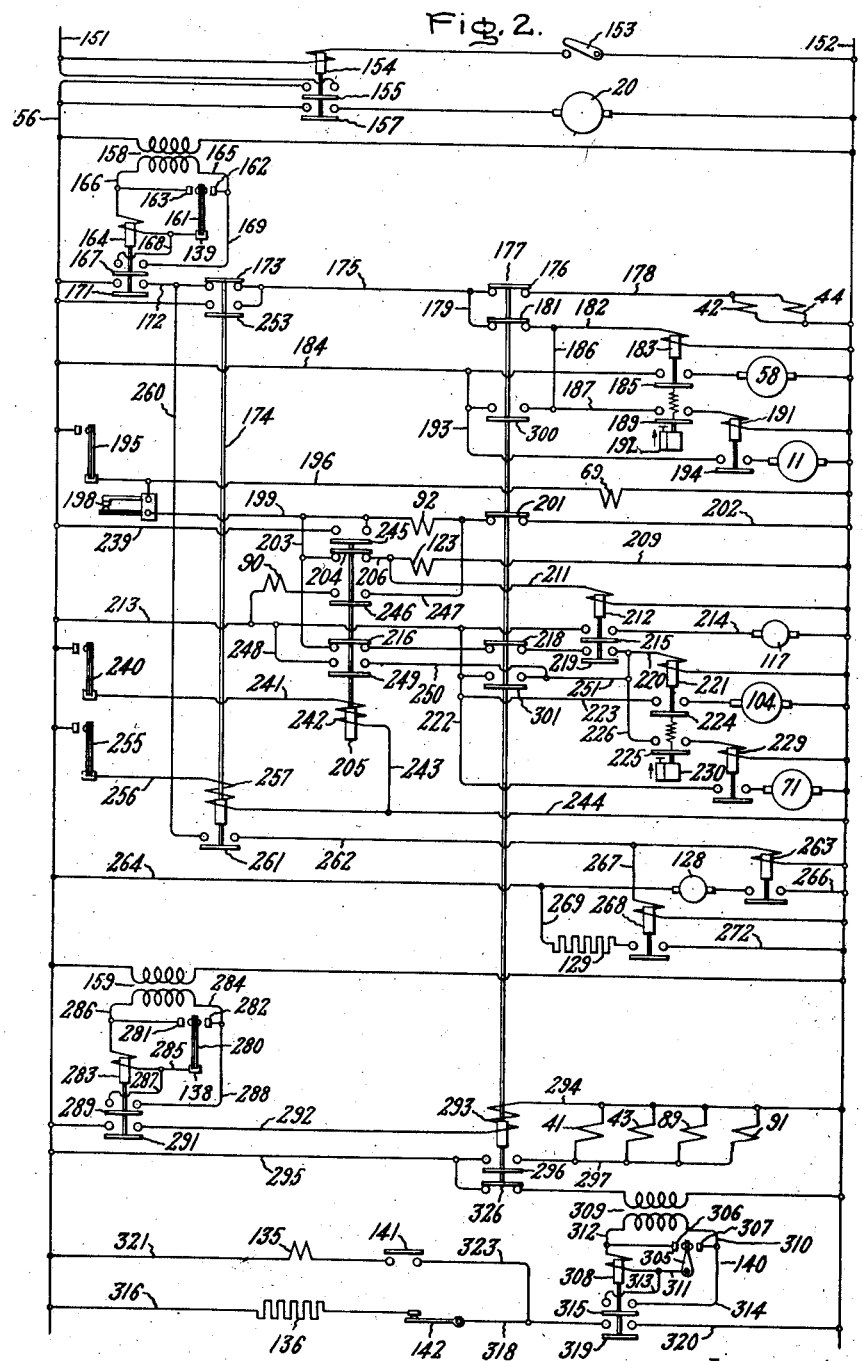

Patented May 6, 1941

2,241,060

UNITED STATES PATENT OFFICE 2,241,060

HEAT PUMP SYSTEM

Hal Gibson, Dallas, Tex., assignor to General Electric Company, a corporation of New York Application August 24, 1939, Serial No. 291,720

17 Claims. (Cl. 257—3)

My invention relates to systems for conditioning the air within rooms or enclosures, and particularly to such systems which utilize reversible refrigerating machines to supply both heating and cooling mediums.

Heat pumps or reversed cycle refrigerating machines may be employed to heat the air within the rooms of dwelling houses or other buildings. A heat pump commonly comprises a compression refrigerating machine including two heat exchangers, a compressor, and an expansion valve. One of the heat exchangers is arranged to provide heat for the air in the enclosure, and the other heat exchanger is arranged outside the enclosure to absorb heat. In some installations the refrigerating machine is made reversible and each of the exchangers may be operated either as a condenser or as an evaporator, depending upon whether the building is to be heated, as during winter operation, or cooled, as during summer operation. It is well known that the efficiency of a reversed cycle heat pump drops off when supplying heat to an enclosure, particularly when the demand for heat is great, as when the outdoor temperature falls to zero or below. If the heat pump is selected with a view of being adequate under the extreme low temperatures, then a size of compressor is involved that is so much larger than that necessary for refrigeration, that it is not only uneconomical from the standpoint of equipment investment cost, but is also out of balance from the standpoint of having approximately the same equipment performing the job in summer and in the winter. If an attempt is made to avoid that condition, then some provision must be made for taking care of the extreme cold weather conditions by auxiliary heating means, or by storing heat for the contingency in advance of the extreme cold period or by a combination of the two. It is an object of my invention to provide a fluid heating apparatus embodying a reversed cycle refrigerating machine and having an improved arrangement for the accumulation and storage of heat, which stored heat is then utilized for assisting in the heating of the enclosure during subsequent periods of abnormally low outdoor temperatures.

It is a further object of my invention to provide a new and improved arrangement for heating an enclosure including a plurality of heat pumps adapted to be selectively controlled in accordance with conditions of the enclosure temperature and outdoor temperature whereby the heat pumps are operated in an efficient and economical manner.

It is another object of my invention to provide a new and improved system for controlling a plurality of cooperating reversible heat pumps for maximum efficiency.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawings in which Fig. 1 shows diagrammatically the arrangement of the heat pump apparatus for supplying heat to the air within an enclosure; while Fig. 2 shows in a diagrammatic form an automatic control system for the apparatus shown in Fig. 1.

In accordance with my invention, the heat pump is divided into a pair of substantially similar refrigerating systems, one of which will be termed the base load system, and the other, the storage system. During heating operation these systems are controlled by a heating thermostat arranged within the enclosure, with the storage system supplementally controlled by a plurality of outdoor thermostats. The base load system is preferably of such size that it can satisfy the heating requirements of the building during mild weather conditions while operating with optimum efficiency. Upon a predetermined low outdoor temperature within the capacity range of the base load system, the storage system is thrown into operation to pump heat from outdoors into a reservoir containing a suitable heat storage medium. Upon the occurrence of a second lower predetermined outdoor temperature, corresponding approximately to the maximum capacity of the base load system, the storage system refrigerating machine will be connected for operating in parallel with the base load system to pump heat from outdoors into the enclosure. Upon the occurrence of a third predetermined extreme low outdoor temperature corresponding to the maximum output of the two refrigerating machines, the medium in the heat storage reservoir will be circulated through suitable heat exchanger apparatus so as to assist the refrigerating machines in supplying the heating requirements for the enclosure. The heat storage medium circulated is additionally heated to a predetermined temperature by an auxiliary electric heater. When cooling the enclosure, both refrigerating machines are operated simultaneously and in parallel under the control of the cooling thermostat arranged within the enclosure. During such operation the heat storage reservoir and the associated apparatus are inoperative.

Referring now to Fig. 1 of the drawings, the base load system comprises a compressor 10 driven by a motor 11 and connected in a refrigerant circuit including an indoor heat exchanger 12 and a pair of outdoor heat exchangers 13 and 14. The heat exchanger 12 is arranged within a duct 15 provided with a fresh air inlet 16 and a recirculated air inlet 17 communicating with the enclosure to be conditioned and passing through a wall 18 of the enclosure. Air is circulated through the duct 15 by operation of a fan 19 driven by a motor 20 and is discharged into the enclosure through a duct 21 passing through the wall 18. Electrically operated valves 22, 23, 24, and 25 are provided for selecting the direction of flow of refrigerant through the refrigerant circuit of the heat pump. The heat exchangers 12, 13, and 14 are provided with thermostatic expansion valves 26, 27, and 28, respectively, which control the admission of refrigerant to the exchangers when they operate as evaporators. The valve 26 is operable to control the admission of refrigerant to the heat exchanger 12 when that heat exchanger is being employed as an evaporator, check valves 30 and 31 being provided to prevent flow of refrigerant through the expansion valve 26 when the heat exchanger 12 is being employed as a condenser. Check valves 32, 33, and 34, 35 are provided to cooperate with the thermostatic expansion valves 27 and 28, respectively, and automatically control the flow of refrigerant so that the valves 27 and 28 are effective only when the heat exchangers 13 and 14 are being utilized as evaporators. The electrically operated valves 22, 23, 24, and 25 are biased to their closed positions by springs 36, 37, 38, and 39, respectively, and are provided with solenoids 41, 42, 43, and 44, respectively, for opening the valves in opposition to the springs. When it is desired to operate the heat exchanger 12 as a condenser to heat the air passing through the duct 15, the valves 23 and 25 are held open by operation of their respective solenoids and when it is desired to operate the heat exchanger 12 as an evaporator or cooling element to cool the air passing through the duct 15, the valves 22 and 24 are held open by operation of their solenoids. Only one pair of valves may be held open at a time.

During the operation of the base load system to heat the air passing through the duct 15, refrigerant is compressed by the compressor 10, discharged through the outlet 45, through the valve 23 and a conduit 46 into the heat exchanger 12 where it is cooled by the air passing through the duct 15 and is liquefied. The liquid refrigerant leaving the heat exchanger 12 flows through the by-pass connection 48, the check valve 31 and a conduit 49, and thence through the check valves 32 and 34, scale traps 50 and 51, the expansion valves 27 and 28 into the heat exchangers 13 and 14 acting as evaporators. The check valves 33 and 35 are held closed to prevent the passage of refrigerant through the by-pass connections 52 and 53 respectively. The liquid refrigerant is admitted to the heat exchangers 13 and 14 by operation of the expansion valves 27 and 28 having thermostatic control bulbs 54 and 55 respectively secured to the outlets of the evaporator units 13 and 14. The heat exchangers 13 and 14 are arranged within a duct 56, and air from outside the enclosure to be conditioned, and preferably outdoor air, is circulated over the heat exchangers 13 and 14 by operation of a fan 57 driven by a suitable motor 58, it being discharged through a duct 59 outside the enclosure to be conditioned. The refrigerant within the exchangers 13 and 14 is vaporized by the absorption of heat from the air passing through the duct 56, and the vaporized refrigerant is returned to the compressor 10 through a conduit 61, connection 62, valve 25, and suction connection 63 of the compressor.

During very mild heating weather it may not be necessary to operate the base load system at maximum capacity, and provision is made for cutting off a certain portion of the outdoor evaporator for limiting the compressor load at such times. An electrically operated valve 60 is provided in the inlet conduit to the heat exchanger section 14 which valve in the closed position will cause the refrigerant to be circulated only through the expansion valve 27 and the evaporator section 13, thereby limiting the condenser head pressure and at the same time tending to give better temperature regulation. The valve 60 is normally biased to the closed position by a spring 65 and operable to the open position by solenoid 66.

During the operation of the base load machine to cool the air passing through the duct 15, the valves 22 and 24 are opened and the refrigerant compressed within the compressor 10 is discharged through the connection 45, the valve 24, conduit 61 into the heat exchangers 13 and 14 serving as condensers. The compressed refrigerant within the heat exchangers 13 and 14 is cooled and liquefied by the air passing through the duct 56. The liquid refrigerant is discharged through the by-pass conduits 52 and 53 into the conduit 49 from whence it flows through the check valve 30, and the scale trap 66. The check valve 31 is closed in order to prevent the flow of refrigerant through the by-pass connection 48. Liquid refrigerant from the scale trap is admitted to the heat exchanger 12 by operation of the thermostatic expansion valve 26, the valve being provided with a thermostatic control bulb 67 secured to the exchanger 12 near the discharge end thereof. The liquid refrigerant within the heat exchanger 12 absorbs heat from the air passing through the duct 15 and thereby cools the air, the refrigerant being vaporized and discharged from the heat exchanger through the conduit 46 from which it is returned to the compressor 10 through the connection 68, valve 22 and suction connection 63.

The base load system just described is preferably of such capacity that it will furnish ample heat for the enclosure during seasons of mild outdoor temperatures. During such time the storage system is shut down and is thrown into operation as the need for additional heating becomes apparent, such as upon a predetermined lowering of the outdoor temperature.

The refrigerating machine of the storage system is largely similar to that of the base load system, and includes a compressor 70 driven by a motor 71 and connected in a refrigerant circuit including an indoor heat exchanger 72 and an outdoor heat exchanger 73. The heat exchanger 72 is arranged within the duct 15 in a manner similar to the heat exchanger 12. The electrically operated valves 74, 75, 76, and 77 are provided for selecting the direction of flow of refrigerant through the refrigerant circuit of the storage system. The heat exchangers 72 and 73 are provided with thermostatic expansion valves 78 and 79, respectively, which control the admission of refrigerant to the exchangers when they operate as evaporators. The valve 78 is operable to control the admission of refrigerant to the heat exchanger 72 when that heat exchanger is being employed as an evaporator, check valves 81 and 82 being provided to prevent flow of refrigerant through the expansion valve 78 when the heat exchanger 72 is being employed as a condenser. Check valves 83 and 84 are provided to cooperate with the thermostatic expansion valve 79 and automatically control the flow of refrigerant so that the valve 79 is effective only when the heat exchanger 73 is being utilized as an evaporator.

The electrically operated valves 74, 75, 76, and 77 are biased to their closed positions by springs 85, 86, 87, and 88 respectively and are provided with solenoids 89, 90, 91, and 92 respectively for opening the valves in opposition to the springs. When it is desired to operate the heat exchanger 72 as a condenser to heat the air passing through the duct 15, the valves 75 and 77 are held open by operation of their respective solenoids and when it is desired to operate the heat exchanger 72 as an evaporator to cool the air passing through the duct 15, the valves 74 and 76 are held open by operation of their solenoids. Only one pair of these valves may be held open at a time.

The operation of the storage system refrigerating machine in circulating refrigerant through the heat exchangers 72 and 73 is substantially similar to the operation of the base load machine in both the heating and cooling cycles. During the operation of the refrigerating machine of the storage system to heat the air passing through the duct 15, refrigerant is compressed by the compressor 70, discharged through the outlet 93, the valve 75, connection 94, conduit 95, and into the heat exchanger 72 where it is cooled by the air passing through the duct 15 and is liquefied. The liquid refrigerant leaving the heat exchanger 72 flows through the by-pass connection 96, the check valve 82, and conduit 97, through the check valve 83, the scale trap 98, the expansion valve 79, and into the heat exchanger 73 acting as an evaporator. The check valve 84 is held closed to prevent the passage of refrigerant through the by-pass connection 99. The liquid refrigerant is admitted to the heat exchanger 73 by operation of the expansion valve 79 having a thermostatic control bulb 101 secured to the outlet of the evaporator unit 73. The heat exchanger 73 is arranged within a duct 102 and air from the outside of the enclosure to be conditioned, and preferably outdoor air, is circulated over the heat exchanger 73 by operation of a fan 103 driven by a suitable motor 104, it being discharged through a duct 105 outside the enclosure to be conditioned. The refrigerant within the exchanger 73 is vaporized by the absorption of heat from the air passing through the duct 102, and the vaporized refrigerant is returned to the compressor 70 through a conduit 106, valve 77, and the suction connection 107 of the compressor.

During the operation of the refrigerating machine of the storage system to cool the air passing through the duct 15, the valves 74 and 76 are opened and the refrigerant compressed within the compressor 70 is discharged through the connection 93, the valve 76, connection 108, conduit 106 into the heat exchanger 73 serving as a condenser. The compressed refrigerant within the heat exchanger 73 is cooled and liquefied by the air passing through the duct 102. The liquid refrigerant is discharged through the by-pass conduit 99 into the conduit 97 from whence it flows through the check valve 81, and the scale trap 109. The check valve 82 is closed in order to prevent the flow of refrigerant through the by-pass connection 96. Liquid refrigerant from the scale trap 109 is admitted to the heat exchanger 72 by operation of the thermostatic expansion valve 78, the valve being provided with a thermostatic control bulb 110 secured to the exchanger 72 near the discharge end thereof. The liquid refrigerant within the heat exchanger 72 absorbs heat from the air passing through the duct 15 and thereby cools the air, the refrigerant being vaporized and discharged from the heat exchanger through the conduit 95, valve 74, and suction connection 107 to the compressor 70.

Since it is economically undesirable to provide refrigerating machines of such capacity as will be sufficient for supplying the heating requirements for the enclosure during the occasional periods of extreme low temperature, means are provided for storing heat within a reservoir which stored heat is then utilized for assisting the heating operation of the refrigerating machines during the periods of abnormally low temperature. The heat storage reservoir 112 is provided for containing any suitable heat storage medium, such as water, which is connected by conduits 113 and 114 with a second condenser or heat transfer unit 115 adapted to be connected to the compressor 70. A circulating pump 116 driven by a suitable motor 117 is arranged in the conduit 114. A refrigerant coil 118 arranged within the unit 115 is connected at one end by a conduit 119 with the discharge connection 93 of the compressor 70, the other end of the coil 118 being connected by conduit 120 with the conduit 97. Arranged in the conduit 119 is an electrically operated valve 121 biased to the opened position by a spring 122 and adapted to be operated to the closed position by the solenoid 123. A heat exchanger 124 arranged within the duct 15 is connected to the reservoir 112 by the conduits 125 and 126, the circulation of liquid between the reservoir 112 and the exchanger 124 being effected by the pump 127 arranged in the conduit 126. The pump 127 is driven by a suitable motor 128 which in turn is energized through the control system upon demand for heating from the storage reservoir. Arranged within the conduit 125 supplying liquid to the heat exchanger 124 is a suitable auxiliary electric heater 129 for the purpose of supplying additional heat to the storage liquid.

In order to properly humidify the air passing through the duct 15 into the enclosure during the heating operation of the system, a water pan 131 is provided in the bottom of the duct. Water is admitted into the pan through a conduit 132 from a suitable source of supply, the flow being controlled by a valve 133 normally biased to the closed position by means of a spring 134 and operable to the opened position by a solenoid 135. The water within the pan 131 is preferably heated by means of an electric heater 136 in order to increase the absorption thereof by the air. A float 137 is suitably arranged within the pan 131 and is adapted to close a switch 141 for energizing the solenoid 135 for maintaining a predetermined level of water within the pan. A second switch 142 is adapted to be controlled by the float 137 for de-energizing the heater 136 in the event that the water within the pan falls to a predetermined low level, which might occur upon the failure of the water supply. The humidifier control circuits will be described below in greater detail.

For controlling the operation of the air conditioning system, I provide a cooling control thermostat 138 and a heating control thermostat 139, both thermostats being located so that they are responsive to the temperature of the air within the enclosure to be conditioned. When there is a demand for cooling, the thermostat 138 takes over the control of the refrigerating machines and operates the valves for the cooling cycle. When there is a demand for heating, the thermostat 139 takes over the control of the refrigerating machines and the valves are set for the heating cycle. A humidostat 140 is also arranged within the enclosure for controlling the humidity of the air supplied to the enclosure. A plurality of thermostats responsive to various limits of the outdoor temperature are arranged within the fresh air duct 16 for controlling various phases of the operation of the refrigerating machines, the purpose and functioning of which thermostats will be made clear as the description of the control system proceeds.

Referring now to Fig. 2, the control for the air conditioning system will be described. In this diagram the same reference characters will be used to identify corresponding electrically operated elements shown in the diagrammatic arrangement of Fig. 1.

Power is supplied to the system from a suitable source of supply through the lines 151 and 152. To put the system into operation, the control switch 153 is first closed, which connects relay 154 across the supply lines 151, 152. As relay 154 picks up, its contact arm 155 closes a circuit connecting the supply line 152 with the conductor 156 which with line 152 supplies power to the remainder of the system. The arm 157 of relay 154 simultaneously connects the main fan blower motor 20 across the lines 152, 156 to start circulation of air through the duct 15. At the same time the primary winding of the transformer 158 is energized for supplying power to the heating thermostat 139 and also the primary winding of the transformer 159 is energized for supplying power to the cooling thermostat 138. The heating control thermostat 139 comprises a bimetallic member 161 and a pair of fixed contacts 162 and 163. During the operation of the air conditioning system when there is a demand for heating, the bimetallic strip 161 will bend to the right thereby completing an energizing circuit for the relay 164, which circuit extends from the right-hand terminal of the secondary winding of transformer 158 through the conductor 165, the contact 162, thermostatic element 161, the winding of relay 164, conductor 166 to the other terminal of the transformer secondary winding. As the relay 164 picks up, a holding circuit is established therefor through its arm 167 and lines 168 and 169 parallelling the thermostat element 161 and fixed contact 162. Another circuit is established upon the closure of the relay 164 for effecting the opening of the electrically operated valves 23 and 25 and for simultaneously starting the fan 57 for circulating air through heat exchanger units 13 and 14 of the base load system. For convenience, the heat exchangers 13 and 14 as well as the heat exchanger 73 will be simply referred to as the outdoor heat exchangers, while the various heat exchangers arranged within the duct 15 will be referred to as the indoor heat exchangers. The valve operating circuit extends from the supply line 156 through the contact arm 171 of the relay 164, line 172, contact arm 173 of the normally closed relay 174, line 175, contact arm 176 of the normally closed relay 177, line 178, the solenoids 42 and 44 connected in parallel, to the other supply line 152. The control circuit for the outdoor fan motor 58 extends from the energized line 175 through the connection 179, the closed arm 181 of the relay 177, line 182, winding of the relay 183 to supply line 152. As relay 183 picks up, an energizing circuit is established for the motor 58 extending from the supply line 156 through line 184, the arm 185 of relay 183, through motor 58 to the other supply line 152.

A predetermined time following the operation of relay 183, another circuit will be established for connecting the base load system compressor motor 11 across the supply lines. This circuit extends from the energized line 175, connection 179, arm 181 of the relay 177, connection 186, line 187, the arm 189 of relay 183 through the winding of relay 191 to the other supply line 152. The arm 189 of relay 183 is restrained against closure by a suitable time delay device 192 until a predetermined time following the pick-up of the relay 183. Upon the closure of the control relay 191, a circuit is established for energizing the motor 11 which circuit extends from the supply line 156 through line 184, connection 193, the arm 194 of the relay 191, the motor 11 to the other supply line 152. The time delay in connecting the compressor motor 11 to the supply line is incorporated in order to insure that all liquid and gas transients are smoothed out before the new cycle of operation occurs. Such transients are likely to occur when quick switching from heating to cooling operation is required. The compressor will circulate refrigerant between the indoor heat exchanger 12 acting as a condenser and the outdoor heat exchanger unit 13 acting as an evaporator to pump heat from the outdoor atmosphere into the enclosure. During this time the valve 60 is in its closed position so that only the outdoor heat exchanger unit 13 is included in the refrigerant circuit. The base load refrigerating machine will continue in operation to pump heat from outdoors into the enclosure until the demand for heat thereby is satisfied. Upon such time the thermostatic element 161 of the thermostat 139 will move to the left to engage contact 163, thereby short circuiting the coil of the relay 164 causing it to drop out. As the arm 171 of the relay 164 moves to the open circuit position, the solenoids 42 and 44 will be deenergized allowing the associated valves to return to their closed positions. Simultaneously the relay 183 will be deenergized, thereby open circuiting the blower motor 58 as well as the compressor motor 11.

Now assume that the base load system is in operation as described above and that the outdoor temperature falls to a first predetermined low value, such as 40 deg. F. A thermostat 195 arranged within the fresh air duct 16 moves to its closed circuit position, thereby completing an energizing circuit through the line 196 for the solenoid 59 for operating the valve 60 to the opened position. The outdoor heat exchanger unit 14 will thereby be connected in parallel with the unit 13. The evaporator capacity is correspondingly increased and a correspondingly greater amount of heat will be pumped into the enclosure for meeting the increased requirement.

The heat storage system also comes into operation at this time to store heat in the reservoir 112 for the contingency of a possible colder wave. The valves 77 and 121 are opened and the refrigerating machine is operated to circulate refrigerant between the condenser or heat transfer unit 115 and the outdoor unit 73 acting as an evaporator. The energizing circuit for the operating solenoid 92 of valve 77 extends from the supply line 156 through the contacts of the thermostat 195, line 196 through the closed contacts of the reservoir thermostat 198, line 199, the solenoid 92 of valve 77, the normally closed arm 201 of the relay 177, line 202 to the other supply line 152. The circuit for operating valve 121 extends from the energized line 199, through connection 203, the normally closed arm 204 of the relay 205, connection 206, the solenoid 123 for opening valve 121, line 209 to the other supply line 152. A circuit is established for putting into operation the heat storage refrigerating machine which circuit extends from the energized line 206 through the line 211, the control relay 212 to the supply line 152. As relay 212 picks up, the motor 117 coupled for driving the heat storage liquid circulating pump 116 is connected directly across the supply lines 156 and 152 through the line 213, arm 215 of relay 212, and line 214. A second circuit is established by relay 212 extending from the supply line 156 through the thermostat 195, thermostat 198, line 199, line 203, the normally closed arm 216 of the relay 205, arm 218 of the relay 177, arm 219 of the closed relay 212, line 220, the winding of control relay 221, to the other supply line 152. As relay 221 picks up, a circuit is closed for energizing the motor 104 coupled for driving the fan 103 of the outdoor heat exchanger 73. This circuit extends from the supply line 156 through lines 213, 222, 223, the arm 224 of the relay 221 through the motor 104 to the other supply line 152. A predetermined time following the pick-up of relay 221, a second arm 225 thereof closes another circuit for effecting the energization of the compressor motor 71. This circuit extends from the supply line 156 through thermostats 195 and 198, through lines 199, 203, arm 216 of relay 205, arm 218 of relay 177, the closed arm 219 of relay 212, line 226, the arm 225 of relay 221, the winding of the control relay 229, to the other supply line 152. The time delay operation of the arm 225 is effected by a suitable restraining device indicated at 230. As relay 229 picks up, an energizing circuit is established from the supply line 156 through lines 213, 222, for the compressor motor 71 of the heat storage refrigerating machine. As long as the outdoor temperature remains below 40 deg. F., and above a second lower predetermined value, the refrigerating machine of the heat storage system is maintained in operation until the temperature of the heat storage medium reaches an appropriate value determined by the discharge temperature of the compressor, for example, 120 deg. F. The reservoir thermostat 198 may be adjusted to open at this value. As the temperature of either the outdoor atmosphere or the liquid within the storage reservoir is increased above these predetermined values, the corresponding thermostat, 195 or 198, will open its contacts to effect the deenergization of the heat storage refrigerating machine and to effect the return of the valves 77 and 121 to the normally closed position.

When the outdoor temperature falls to a second lower predetermined value, for example, to 26 deg. F., the base load system may no longer be able to supply the required amount of heat for the enclosure. The refrigerating machine of the heat storage system may then be connected for operating parallel with the base load system for direct heating of the enclosure. When this condition of outdoor temperature occurs, a second thermostat 240 arranged within the fresh air duct 16 closes its contacts to complete a circuit extending from the supply line 156 through the line 241, the solenoid of the relay 205, lines 243, 244 to the other supply line 152. When the relay 205 picks up, the arm 204 thereof raises to break the energizing circuit for the solenoid 123, allowing valve 121 to move to the closed position under the force of its biasing spring. The operating solenoid 92 of valve 77 will now be energized through a circuit extending from the supply line 156 through line 239, the arm 245 of the relay 205, line 199, the solenoid 92, through the arm 201 of relay 177, and line 202 to the supply line 152. Simultaneously, the operating solenoid 90 of valve 75 will be energized to move that valve to the opened position, the energizing circuit extending from the supply line 156 through the line 213, the solenoid 90, arm 246 of the relay 205, line 247, to line 199, through the arm 201 of relay 177, line 202 to the supply line 152. It will be noted that as the arm 204 of the relay 205 moved to the open circuit position, the energizing winding of relay 212 was thereby open circuited causing it to drop out and deenergize the pump motor 117. Another circuit is established, however, for maintaining the operation of the fan motor 104 and the compressor motor 71. This circuit extends from the supply line 156 through lines 213, 248, the arm 249 of the relay 205, lines 250, 251, 220 through the winding of relay 221 to the other supply line 152. Below the value for which the thermostat 240 is set, the heat storage refrigerating machine will run continuously to supply heat directly to the enclosure, while the base load system continues to operate, as before, under the control of the heating thermostat 139 as previously described to regulate the enclosure temperature.

Upon the occurrence of a condition of extremely low outdoor temperature, for example, such as 5 degrees F., a third thermostat 255, arranged within the fresh air duct 16, moves to its circuit closing position, completing an energizing circuit for the winding 257 of relay 174 through lines 256, and 244. As the relay 174 picks up, the base load system is thrown directly across the line for continuous operation by the opening of arm 173 and the closing of arm 253, while the heating thermostat 139 is connected for controlling the pump 127 for circulating heat storage liquid through the heat exchanger 124. The latter circuit extends from the supply line 156, the arm 171 of the thermostat relay 164, through lines 172, 260, arm 261 of relay 174, line 262 to the winding of relay 263, to the other supply line 152. As the relay 263 picks up, an energizing circuit is completed through lines 264, 266 for the motor 128 coupled for driving the pump 127. A parallel circuit is also established extending from the energized line 262 through line 267 for the relay 268 which connects the heater 129 across the supply lines through lines 264, 269 and 272. The heater 129 is of such capacity that it will raise the temperature of the water being circulated through the heat exchanger 124 to a suitable higher temperature, for example, approximately 160 deg. F. Below 5 deg. F. the two refrigerating machines, that is, of the base load system and of the heat storage system, operate continuously to pump heat from outdoors into the enclosure. The temperature within the enclosure is regulated by the heating thermostat 139 controlling the on and off operation of the heat storage circulating pump 127 and the electric heater 129.

Following through the operation of the system for a reversal of the sequence just described, as would occur during a rising condition of outdoor temperature, the thermostat 255 will first open its contacts upon the outdoor temperature rising above 5 deg. F. The energizing circuit for the winding 257 of relay 174 will be broken, causing that relay to drop out thereby disconnecting the heat storage circulating pump motor 128 and the electric heater 129 from the control of the heating thermostat 139 and connecting the thermostat 139 for controlling the periodic operation of the base load system as previously described. Upon further increase in outdoor temperature, for example, to a value above 26 deg. F., the thermostat 240 will open its contacts thereby breaking the energizing circuit for the winding 242 of relay 205. As that relay drops out, the refrigerating machine of the heat storage system will be disconnected from the heat exchanger 72 and will be operated continuously to pump heat into the storage reservoir 112. The base load system then will operate alone to supply the heating requirements for the enclosure. Upon a further increase in outdoor temperature, for example, above 40 deg. F., the thermostat 195 will open its contacts thereby shutting down the heat storage machine and breaking the circuit for solenoid 69, causing valve 68 to move to its closed position. The evaporator section 14 of the outdoor heat exchanger will be thus disconnected from the refrigerant circuit of the base load system, since ample heat for satisfying the requirements of the enclosure may be transferred from the outdoor unit 13 to the indoor heat exchanger 12.

Upon a predetermined rise of the enclosure temperature above the normal operating range of the heating thermostat 139, for example, 5 degrees, the cooling thermostat 138 comes into operation. The cooling thermostat 138 is similar to the heating thermostat 139 and comprises a thermostatic element 280 and a pair of fixed contacts 281 and 282. Upon a call for cooling, the element 280 will bend to the right engaging with contact 282 thereby completing an energizing circuit for the winding of relay 283, which circuit extends from the right-hand terminal of the secondary winding of transformer 159 through the line 284, the contact 282, thermal element 280, line 285, the relay 283, line 286, to the other terminal of the transformer secondary winding. As relay 283 picks up, a holding circuit is established therefor through lines 287 and 288 and arm 289 paralleling the thermal element 280 and fixed contact 282. Another circuit established by relay 283 for energizing the winding of relay 177 extends from the supply line 156 through the arm 291 of the relay 283, line 292, the winding 293 of relay 177, line 294 to the other supply line 152. As relay 177 picks up, an energizing circuit is established for operating the proper refrigerant circuit control valves of both refrigerating machines for effecting cooling of the air for the enclosure. This circuit extends from the supply line 156 through conductor 295, through the arm 296 of the relay 177, through line 297 to the operating solenoids 41, 43, 89, and 91 of valves 22, 24, 74, and 76 respectively. The energization of the base load refrigerating machine will be effected by the closure of the arm 300 of the relay 177, which completes an energizing circuit extending from the supply line 156, the line 184, line 193, arm 300 of the relay 177, lines 181, 186, 182, through the winding of the relay 183 to the other supply line 152. As the relay 183 picks up, the fan motor 58 is started followed a predetermined time later by the energization of the compressor motor 11. Since the duct thermostat 195 will now be in its open circuit position, the solenoid 69 will be deenergized and valve 68 will be in its closed position. Both outdoor units 13 and 14 of the base load system will function as condensers, however, since they will discharge through the by-passes 52 and 53. Solenoid 123 and relay 212 are deenergized due to the opened condition of the thermostat 195 so that the valve 121 and the circulating pump motor 117 of the heat storage system are inoperative during the cooling cycle. The refrigerating machine of the base storage system, however, will be operated in parallel with the machine of the base load system under the control of the cooling thermostat 138 through the relay 177. Upon the closure of the contact arm 301 of relay 177, a circuit will be established extending from the supply line 156, through lines 213, 222, contact arm 301 of relay 177, lines 251, 226, 220, the winding of relay 221, to the other supply line 152. As the relay 221 picks up, an energizing circuit will be established for the blower fan motor 104 followed a predetermined time later by the energization of the compressor motor 71 of the storage system refrigerating machine. Thus it is seen that during cooling, both refrigerating machines will be operated simultaneously and in parallel under the control of the cooling thermostat 138.

When the system is operating for heating, the humidity of the air supplied to the enclosure is controlled by the humidostat 140 suitably arranged within the enclosure. The humidostat comprises a humidity responsive element 305 and a pair of oppositely arranged fixed contacts 306 and 307. When the humidity of the air drops below a predetermined value, the element 305 will be actuated to the right engaging with the fixed contact 307, thereby completing an energizing circuit for the relay 308, the circuit extending from the right-hand terminal of the secondary winding of the transformer 309 through line 310, fixed contact 307, element 305, line 311, winding of the relay 308, line 312 to the other terminal of the transformer secondary winding. As the relay 308 picks up, a holding circuit is established therefor through the lines 313 and 314 and contact arm 315 of the relay 308 paralleling the element 305 and contact 307. As the relay 308 picks up, an energizing circuit is also established for the humidifier heater 136 located in the bottom of the water pan 131 arranged in the lower portion of the air duct 15. This circuit extends from the supply line 156 through line 316, heater 136, protective switch 142, line 318, arm 319 of the relay 308, line 320 to the other supply line 152. Another circuit is established parallel with the heater circuit for energizing the solenoid 135 of the water supply valve 133 under the control of the float 137 arranged within the water pan 131. This circuit may be traced from the supply line 156, through line 321, solenoid winding 135, float switch 141, line 323, contact arm 319 of the relay 308, line 320 to the other supply line 152. Should the level of the water within the pan 131 fall below a predetermined point, the float switch 141 will be closed thereby energizing the operating solenoid 135 for opening the valve 133 to admit more water to the pan. Upon the reestablishment of the predetermined level of water, the float switch 141 will be opened deenergizing the solenoid 135, permitting the valve 133 to be actuated to its closed position. In the event of failure of water supply, and should the water level in the pan 131 drop below a second predetermined point, for example, so as to uncover the humidifier heater, the second switch 142 will be opened by the float 137 to effect the deenergization of the humidifier heater 136 even though the humidostat 140 may be calling for additional moisture. It will be noted that the humidifier will be in operation only when the system is in heating operation or when the relay 177 is in the deenergized condition. The energizing circuit for the transformer 309 is completed through the contact arm 326 of the relay 177, in its lower position. When the system is conditioned for cooling, that is, upon the control of the system being taken over by the cooling thermostat 138, the relay 177 will be actuated to its upper position causing the contact arm 326 to open the circuit for the transformer 309 thereby deenergizing the humidifier apparatus.

Although I have described my invention in connection with a refrigerating machine for conditioning the air within an enclosure, other uses will readily be apparent to those skilled in the art. I do not, therefore, desire my invention to be limited to the particular construction shown and described, and I intend in the appended claims to cover all modifications falling within the spirit and scope of my invention.

What I claim as new and desire to secure by Letters Patent of the United States, is:

1. Apparatus for heating the air within an enclosure including a duct, a reversed cycle refrigerating machine comprising a compressor, a condenser, and an evaporator, said condenser being arranged within said air duct for heating air circulated therethrough, means for circulating air through said duct and into said enclosure, said evaporator comprising a pair of parallel connected heat exchanger units arranged outside of said enclosure and said duct, normally closed valve means for excluding one of said heat exchanger units from the refrigerant circuit, and means responsive to the temperature of air to be heated for opening said valve.

2. Apparatus for heating the air within an enclosure including a duct, a refrigerating machine comprising a compressor, a condenser and an evaporator, said condenser being arranged within said duct for heating the air for said enclosure, means for circulating air through said duct and into said enclosure, said evaporator comprising a plurality of heat exchanger units adapted to be connected in the refrigerant circuit for parallel operation, and means responsive to the temperature of air to be heated for controlling the inclusion of one of the heat exchanger units in the refrigerant circuit.

3. Apparatus for heating the air within an enclosure including a duct, a refrigerating machine comprising a compressor, a condenser, and an evaporator, said condenser being arranged within said duct, means for circulating air through said duct and into said enclosure, said evaporator comprising a plurality of heat exchanger units adapted to be connected in the refrigerant circuit for parallel operation, said evaporator being arranged outside of said enclosure and said duct, normally closed valve means for excluding certain of said heat exchanger units from the refrigerant circuit, and means responsive to predetermined temperature limits of air to be heated for opening said valves for increasing the heating capacity of said refrigerating machine.

4. In combination with a reversed cycle refrigerating machine comprising a compressor, a first and a second evaporator-condenser sections, said second evaporator-condenser section comprising a plurality of parallel connected heat exchange units, valve means for selectively controlling the flow of refrigerant to certain of said units when operating as evaporators, means responsive to predetermined conditions for adjusting said valves, and means operative when said units are operating as condensers for connecting said units for parallel operation independently of said valves.

5. Apparatus for heating the air within an enclosure including a duct, means for circulating air through said duct, a refrigerating machine comprising a compressor, a condenser, and an evaporator, said condenser being arranged within said duct for heating the air circulated therethrough, a reservoir containing a heat storage liquid, a second condenser adapted to be connected to said compressor for heating the liquid in said reservoir, means responsive to one predetermined outdoor temperature for connecting said compressor to said second condenser for heating the liquid in said storage reservoir, and means responsive to a second lower predetermined outdoor temperature for transferring the connection of said compressor from said second condenser to said first condenser for directly heating air for said enclosure.

6. Apparatus for heating the air within an enclosure including a duct, means for circulating air through said duct, a refrigerating machine comprising a compressor, a condenser, and an evaporator, said condenser being arranged within said duct for heating the air circulated therethrough, a reservoir containing a heat storage liquid, a second condenser adapted to be connected to said compressor for heating the liquid in said storage reservoir to a predetermined temperature, a heat exchanger arranged within said duct, means for circulating the liquid from said storage reservoir through said heat exchanger, and means for heating the liquid being circulated from said reservoir through said heat exchanger to a second higher predetermined temperature.

7. Apparatus for heating the air within an enclosure including a duct, a refrigerating machine comprising a compressor, a condenser, and an evaporator, said condenser being arranged within said duct for heating the air circulated therethrough, a reservoir containing a heat storage liquid, a second condenser adapted to be connected to said compressor for heating the liquid in said storage reservoir, a heat exchanger arranged in said duct, means for circulating the liquid from said storage reservoir through said heat exchanger, means for heating the storage liquid circulated through said heat exchanger to a second higher predetermined temperature, means responsive to a predetermined outdoor temperature for operating said refrigerating machine for pumping heat from outdoors into said storage reservoir, means responsive to a predetermined temperature within said enclosure for operating said refrigerating machine for pumping heat from outdoors to said first condenser, and means responsive to a second lower predetermined outdoor temperature for simultaneously energizing said liquid circulating means and said heating means.

8. Apparatus for heating the air within an enclosure including a duct, means for circulating air through said duct, a refrigerating machine comprising a compressor, a first condenser, and an evaporator, said first condenser being arranged within said duct for heating the air circulated therethrough, a reservoir containing a heat storage liquid, a second condenser adapted to be connected to said compressor for heating the liquid in said reservoir, means responsive to a first predetermined outdoor temperature for connecting said compressor to said second condenser for heating the liquid in said storage reservoir, means responsive to a second lower predetermined outdoor temperature for connecting said compressor to said first condenser for directly heating the air of said enclosure, and means responsive to a third lower predetermined outdoor temperature for transferring the heat from said storage reservoir to the air for said enclosure.

9. Apparatus for heating the air within an enclosure including a duct, means for circulating air through said duct, a first heat pump having a condenser arranged in said duct for heating the air circulated through said duct, means responsive to the temperature within said enclosure for controlling the operation of said first heat pump, a second heat pump having a condenser arranged within said duct for assisting said first condenser in heating the air circulated through said duct, a reservoir containing a heat storage liquid, a second condenser for said second heat pump for supplying heat to the liquid in said storage reservoir, and means responsive to outdoor temperature for selectively connecting said second heat pump either to said first condenser or to said second condenser.

10. Apparatus for heating the air within an enclosure including a duct, means for circulating air through said duct, a first heat pump having a condenser arranged in said duct for heating the air circulated therethrough, a second heat pump having a first condenser arranged in said duct, a reservoir containing a heat storage liquid, a second condenser for said second heat pump for heating the liquid of said storage reservoir, a heat exchanger arranged in said duct, means for circulating the liquid from said storage reservoir through said heat exchanger, means responsive to the temperature within said enclosure for controlling the operation of said first heat pump for maintaining the temperature within said enclosure within predetermined limits, and means responsive to predetermined ranges of outdoor temperature for selectively controlling the operation of said second heat pump relative to said first and said second condensers and for conditioning said liquid circulating means for control by said enclosure temperature responsive means.

11. Apparatus for heating the air within an enclosure including a first heat pump having a condenser arranged in said duct for heating the air circulated through said duct, a second heat pump having a first condenser arranged in said duct, a reservoir containing a heat storage liquid, a second condenser for said second heat pump for supplying heat to said reservoir, a heat exchanger arranged in said duct, means for circulating the liquid from said storage reservoir through said heat exchanger, means responsive to a predetermined temperature within said enclosure for controlling said first heat pump for heating the air for said enclosure, means responsive to a predetermined outdoor temperature for controlling said second heat pump for heating the liquid in said storage reservoir, means responsive to a second lower predetermined outdoor temperature for controlling said second heat pump for supplying heat to said first condenser for heating the air within said duct, means responsive to a third lower predetermined outdoor temperature for initiating the operation of said heat storage liquid circulating means.

12. Apparatus for heating the air within an enclosure including a duct, means for circulating air through said duct, a plurality of reversed cycle refrigerating machines each comprising a compressor, a condenser, and an evaporator, said condensers of each machine being arranged within said duct for heating the air circulated therethrough, means responsive to the enclosure temperature, one of said refrigerating machines being adapted to be normally controlled by said enclosure temperature responsive means, a reservoir containing a heat storage liquid, a second condenser adapted to be connected to the compressor of one of the other refrigerating machines for heating the liquid in said reservoir, means responsive to one predetermined outdoor temperature for connecting said other compressor to said second condenser, means responsive to relatively lower predetermined outdoor temperatures for conditioning all of said refrigerating machines for directly heating the air for said enclosure, means for transferring the heat from said storage reservoir to the air circulated through said duct including a heat exchanger and a pump, means responsive to a further relatively lower predetermined outdoor temperature for conditioning said pump for control by said enclosure temperature responsive means.

13. Apparatus for conditioning the air within an enclosure including a duct, means for circulating air through said duct, a plurality of reversed cycle refrigerating machines each having a heat exchanger arranged within said duct and a heat exchanger arranged externally of said duct and of said enclosure, means responsive to the temperature within said enclosure for normally controlling the operation of one of said plurality of reversed cycle refrigerating machines during operation for heating the air of said enclosure, means responsive to a first predetermined relatively low temperature of the air to be conditioned for selectively energizing the remainder of said plurality of reversed cycle refrigerating machines for heating the air of said enclosure, auxiliary heating means for said enclosure, and means responsive to a second predetermined relatively lower temperature of the air to be heated for energizing all of said reversed cycle refrigerating machines for continuous operation and connecting said auxiliary heating means for control by said enclosure temperature responsive means.

14. Apparatus for heating the air within an enclosure including a duct, means for circulating the air through said duct, a pair of heat pumps each having a condenser arranged in said duct for heating the air circulated therethrough, means responsive to the temperature within said enclosure for controlling the operation of the first of said pair of heat pumps, means responsive to a predetermined relatively low temperature of the air to be heated for controlling the operation of the second of said pair of heat pumps, auxiliary heating means for said enclosure, and means responsive to a second predetermined relatively lower temperature of the air to be heated for connecting said heat pumps for continuous heating operation and for connecting said auxiliary heating means for control by said enclosure temperature responsive means.

15. Apparatus for heating the air within an enclosure comprising a first refrigerating machine including a condenser for heating the air in said enclosure and a first and second evaporator outside said enclosure, a second refrigerating machine having a condenser for heating the air in said enclosure, an evaporator outside said enclosure and a second condenser, a heat storage means operatively associated with said second condenser and adapted to store heat therefrom, means responsive to the temperature within said enclosure for operating said first refrigerating machine utilizing one of said evaporators for supplying heat to said enclosure, and means responsive to a predetermined temperature of the air being heated for operatively connecting said other evaporator to said first refrigerating machine to increase the capacity thereof and for simultaneously operating said second refrigerating machine to supply heat to said heat storage means.

16. Apparatus for heating the air within an enclosure comprising a first refrigerating machine including a condenser for heating the air in said enclosure and an evaporator outside said enclosure, a second refrigerating machine having a condenser for heating the air in said enclosure, an evaporator outside said enclosure and a second condenser operatively connected to a heat storage means, means responsive to the temperature within said enclosure for controlling the operation of both of said refrigerating machines, means responsive to one predetermined temperature of the air being heated for operating the first refrigerating machine to supply heat to said enclosure and for simultaneously operating said second refrigerating machine to supply heat to said heat storage means, and means responsive to a second predetermined temperature of the air being heated to discontinue the supply of heat from said second condenser to said heat storage means and for operating said second refrigerating machine continuously to supply heat to said enclosure.

17. Apparatus for heating the air within an enclosure comprising a first refrigerating machine including a condenser for heating the air in said enclosure and a first and second evaporator outside said enclosure, a second refrigerating machine having a condenser for heating the air in said enclosure, an evaporator outside said enclosure and a second condenser, a heat storage means operatively associated with said second condenser and adapted to store heat therefrom, means responsive to the temperature within said enclosure for operating said first refrigerating machine utilizing one of said evaporators for supplying heat to said enclosure, means responsive to a predetermined temperature of the air being heated for operatively connecting said other evaporator to said first refrigerating machine to increase the capacity thereof and for simultaneously operating said second refrigerating machine to supply heat to said heat storage means, and means responsive to a second predetermined temperature of the air being heated for discontinuing the supply of heat from said second condenser to said heat storage means and for operating said second refrigerating machine continuously to supply heat to said enclosure.

HAL GIBSON.